United States Patent
Kwon et al.

(10) Patent No.: US 7,310,313 B2
(45) Date of Patent: Dec. 18, 2007

(54) APPARATUS AND METHOD FOR CONTROLLING A REVERSE TRAFFIC RATE IN A MOBILE COMMUNICATION SYSTEM

(75) Inventors: Hwan-Joon Kwon, Gyeonggi-do (KR); Dong-Hee Kim, Seoul (KR); Youn-Sun Kim, Seongnam-si (KR); Dae-Gyun Kim, Seongnam-si (KR); Beom-Sik Bae, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 615 days.

(21) Appl. No.: 10/863,987

(22) Filed: Jun. 9, 2004

(65) Prior Publication Data

US 2005/0018629 A1 Jan. 27, 2005

(30) Foreign Application Priority Data

Jun. 9, 2003 (KR) ............... 10-2003-0036839

(51) Int. Cl.
*H04L 12/26* (2006.01)
(52) U.S. Cl. .............. 370/236; 370/235; 370/328; 370/252; 455/418; 455/419
(58) Field of Classification Search ........ 370/236, 370/328, 235, 252, 338, 335, 342, 331, 333; 455/418, 419
See application file for complete search history.

(56) References Cited

U.S. PATENT DOCUMENTS 6,910,068 B2 * 6/2005 Zintel et al. ............ 709/220
7,050,405 B2 * 5/2006 Attar et al. ............ 370/282
2002/0141349 A1 * 10/2002 Kim et al. ............ 370/252
2003/0081572 A1 * 5/2003 Kim et al. ............ 370/332
2003/0185159 A1 * 10/2003 Seo et al. ............ 370/278
2004/0146016 A1 * 7/2004 Kim et al. ............ 370/328
2004/0198404 A1 * 10/2004 Atlar et al. ............ 455/522
2004/0240400 A1 * 12/2004 Khan ............ 370/280
2005/0018684 A1 * 1/2005 Fagerness et al. ....... 370/395.1
2005/0141454 A1 * 6/2005 Jain et al. ............ 370/331
2005/0181843 A1 * 8/2005 Tsujimoto ............ 455/575.1
2005/0249162 A1 * 11/2005 Kim et al. ............ 370/333
2007/0002783 A1 * 1/2007 Krantz et al. ............ 370/310

* cited by examiner

*Primary Examiner*—Matthew Anderson
*Assistant Examiner*—Minh Dao
(74) *Attorney, Agent, or Firm*—The Farrell Law Firm

(57) ABSTRACT

For reverse transmission/reception of rate control bits, a receiver in a mobile station transmits a message indicating combinability of rate control bits received from several base station systems through signaling, thereby securing efficient transmission/reception of the rate control bits, and improving reliability of the rate control bits. In addition, for reverse transmission/reception of ACK/NACK bits, a receiver in a mobile station transmits a message indicating combinability of ACK/NACK bits received from several base station systems, thereby securing efficient transmission/reception of the ACK/NACK bits, and improving reliability of the ACK/NACK bits.

13 Claims, 8 Drawing Sheets

APPARATUS AND METHOD FOR CONTROLLING A REVERSE TRAFFIC RATE IN A MOBILE COMMUNICATION SYSTEM

PRIORITY

This application claims priority under 35 U.S.C. § 119 to an application entitled "Apparatus and Method for Controlling Reverse Rate in a Mobile Communication System" filed in the Korean Intellectual Property Office on Jun. 9, 2003 and assigned Ser. No. 2003-36839, the contents of which are incorporated herein by reference.

BACKGROUND OF THE INVENTION

1. Field of the Invention

The present invention relates generally to a reverse rate control apparatus and method in a mobile communication system, and in particular, to an apparatus and method for transmitting a control signal for reverse traffic.

2. Description of the Related Art

In a mobile communication system, data transmission is divided into forward data transmission and reverse data transmission. Forward data transmission refers to data transmission from a base station system (BSS) to a mobile station (MS), and reverse data transmission refers to data transmission from the mobile station to the base station system. According to the types of transmission data supported, the mobile communication system can be classified into a system supporting only a voice service, a system supporting a voice service and a simple data service, a system supporting only a high-speed data service, and a system supporting both a high-speed data service and a voice service.

The mobile communication system providing both the high-speed data service and the voice service supports a multimedia service using the same frequency band. In this mobile communication system, a plurality of users simultaneously transmit data by a Code Division Multiple Access (CDMA) scheme. In the CDMA scheme, user identification is achieved through unique numbers assigned to the users. In the CDMA scheme, reverse data transmission is achieved through a packet data channel on a per-physical layer packet (PLP) basis, and a length of the packet is fixed according to a data rate. A data rate of the packet is variable for each packet, and a rate of each packet is controlled by the power and the amount of transmission data of a mobile station and a power control bit (PCB). The power control bit is control information transmitted from a base station system over a rate control channel (RCCH).

In addition, the mobile communication system enables retransmission in a physical layer in order to improve reverse throughput. For retransmission in a physical layer, a base station system demodulates a received reverse data packet, and transmits an ACK/NACK of a physical layer according to whether a packet error, or a packet error, exists in the received reverse data packet.

Upon receiving ACK from the base station system, a mobile station transmits a new packet, determining that the transmitted packet has been successfully received at the base station system. However, if NACK is received from the base station system, the mobile station retransmits the previous packet, determining that the transmitted packet has not been successfully received at the base station system.

A function of determining a data rate of a mobile station is called "scheduling." A data rate of a mobile station is determined by scheduling. A base station system performs the scheduling using Rise over Thermal (RoT), which indicates a ratio of thermal nose to total reception power, or a load obtained from a received signal to nose ratio of a mobile station belonging to a current base station system. When RoT is available, the base station system performs scheduling using measured RoT, assigned load, and available remaining capacity. However, when RoT is unavailable, the base station system measures a load, and performs scheduling by taking the measured load and available remaining capacity into account.

That is, a scheduler of the base station system determines whether to increase, decrease, or hold a data rate of a corresponding mobile station, taking RoT, a buffer status of each mobile station, and power status or channel condition of each mobile station into account.

The base station system can increase the throughput of the system by efficiently controlling a data rate of a mobile station in this manner. The data rate information of a mobile station is transmitted to a particular mobile station through a rate control bit (RCB). A value of the rate control bit transmitted from the base station system is '0', '+1', or '−1'. If a value of the rate control bit is '+1', the mobile station increases its data rate by one step in a next transmission period. If a value of the received rate control bit is '−1', the mobile station decreases its data rate by one step in the next transmission period. If a value of the received rate control bit is '0', the mobile station holds its data rate in the next transmission period.

The scheduler can be included in a base station system (BSS) or a base station controller (BSC) according to system design. In the following description, first "BSS scheduling" will be described, and then "BSC scheduling" will be described.

Generally, a mobile station manages an active set. The "active set" refers to a list of base station systems communicating with the mobile station. For example, while a particular mobile station is performing a handoff, information on several base station systems in communication with the corresponding mobile station is included in an active set of the corresponding mobile station. While performing handoff, a corresponding mobile station receives rate control bits from several base station systems included in its own active set as a result of scheduling. In a system where BSS scheduling is performed, rate control bits received at the mobile station from the base station systems in the active set are different from one another. In a system where BSC scheduling is performed, rate control bits received at the mobile station from the base station systems in the active set are identical to one another.

Some advantages and disadvantages of the BSS scheduling scheme and the BSC scheduling scheme will be described herein below.

In the BSC scheduling scheme, combining is available when receiving rate control bits of a mobile station. Therefore, reception reliability of rate control bits is increased, and the base station system can transmit rate control bits with lower power. However, a scheduling delay time is increased.

"Combining" refers to combining received signals and demodulating the combined signal in a physical layer. Further, the "scheduling delay time" refers to a time required when a mobile station transmits its status information (e.g., buffer capacity or power status) in a reverse direction to undergo scheduling. A base station system receives the status information of the mobile station, performs scheduling using the received status information together with other information necessary for scheduling and transmits the scheduling result to the mobile station. The mobile station receives the scheduling result and applies the received scheduling result.

In the BSS scheduling scheme, the scheduling delay time is short. However, combining is unavailable when receiving rate control bits of a mobile station, thereby causing a decrease in reception reliability of rate control bits. As a result, a base station system should transmit rate control bits with higher power.

A mobile communication system allows retransmission in a physical layer in order to improve reverse throughput. The retransmission in a physical layer includes a base station system demodulating a received reverse data packet and transmitting ACK/NACK of a physical layer according to whether a packet error (or CRC error) exists in the received reverse data packet, and a mobile station receiving the ACK/NACK and determining whether it will retransmit previously transmitted packet or transmit new packet. The retransmission procedure by the physical layer is called "Hybrid Automatic Repeat and Request (HARQ)." In a system supporting the HARQ, when the ACK/NACK bit is generated by a BSS, it is called "BSS transmission," and when the ACK/NACK bit is generated by a BSC, it is called "BSC transmission."

In a system in which BSS transmission is performed, ACK/NACK bits received at a mobile station from base station systems can be different from one another. However, in a system in which BSC transmission is performed, ACK/NACK bits received at the mobile station from the base station systems in the active set will be identical to one another.

As indicated above, in the BSS transmission scheme, a retransmission delay time is reduced. However, combing is unavailable when receiving ACK/NACK bits for a mobile station, thereby causing a reduction in reliability of ACK/NACK bits. In the BSC transmission scheme, combing is available when receiving ACK/NACK bits for a mobile station, thereby causing an increase in reliability of ACK/NACK bits. However, a retransmission delay time is increased. The "retransmission delay time" refers to a time required when a mobile station transmits a packet, a base station system receives the packet, determines whether an error exists in the received packet and transmits an ACK/NACK bit to the mobile station, and the mobile station receives the ACK/NACK bit and transmits a next packet.

According to the BSS scheduling scheme and the BSC scheduling scheme, the mobile station cannot determine a base station system from which rate control bits received can be combined. Therefore, if the mobile station, without knowing the information, receives rate control bits transmitted from all base station systems in its active set, it should always perform independent reception and demodulation process on each of the received rate control bits, thereby decreasing reception reliability of the rate control bits. In order to increase reception reliability of the rate control bits, the base station system should transmit the rate control bits with higher power.

In addition, according to the BSS transmission scheme and the BSC transmission scheme, the mobile station cannot determine a base station system from which ACK/NACK bits received can be combined. Therefore, if the mobile station, without knowing the information, receives ACK/NACK bits transmitted from all base station systems in its active set, it should always perform independent reception and demodulation process on each of the received ACK/NACK bits, thereby undesirably decreasing reception reliability of the ACK/NACK bits.

SUMMARY OF THE INVENTION

It is, therefore, an object of the present invention to provide an apparatus and method for transmitting a control signal for reverse traffic.

It is another object of the present invention to provide an apparatus and method for efficiently controlling a mobile station in a handoff situation.

It is further another object of the present invention to provide an apparatus and method for increasing reliability by sending a message indicating whether combined reception is available for rate control bits received from a base station system by a receiver of a mobile station in a handoff situation.

It is yet another object of the present invention to provide an apparatus and method for increasing reliability by sending a message indicating whether combined reception is available for ACK/NACK bits received from a base station system by a receiver of a mobile station in a handoff situation.

According to one aspect of the present invention, in a mobile communication system including a mobile station, a plurality of base station systems for transmitting traffic and information to the mobile station, and a base station controller connected to the base station systems, for transmitting the information to the mobile station, an apparatus for transmitting control information for the information comprises: a memory for storing information on base station systems included in an active set of the mobile station and combinability information determined according to whether the same information can be transmitted via the base station systems; a signaling processor for performing a signaling procedure for transmitting the control information to the mobile station; and a controller for checking, during handoff of the mobile station, base station systems belonging to the active set of the mobile station, stored in the memory, determining whether the same information can be transmitted to the mobile station via the base station systems in the active set, generating the control information according to the determination result, and outputting the generated control information to the signaling processor.

According to another aspect of the present invention, there is provided a mobile station apparatus in a mobile communication system including a plurality of base station systems for transmitting traffic and information to a mobile station, and a base station controller connected to the base station systems, for transmitting control information indicating combinability of the information transmitted to the mobile station. The mobile station apparatus comprises: a plurality of despreaders for separately despreading the information received from at least two base station systems among the base station systems; a combiner for combining information received via the despreaders; a controller for performing a control operation such that outputs of the despreaders are input to the combiner, when the received control information indicates that the same information from the base station systems can be transmitted; and an information determiner for determining the information based on the combined information output from the combiner.

According to further another aspect of the present invention, there is provided a method for transmitting information in a mobile communication system including a mobile station, a plurality of base station systems for transmitting traffic and the information to the mobile station, and a base station controller connected to the base station systems, for transmitting control information indicating combinability of the information transmitted to the mobile station. The method comprises: checking base station systems belonging to an active set of the mobile station during handoff of the mobile station; determining whether the same information can be transmitted to the mobile station via the base station systems in the active set; generating control information indicating combinability of information transmitted to the mobile station according to the determination result; and transmitting the control information to the mobile station.

According to further another aspect of the present invention, there is provided a method for receiving information in a mobile communication system including a plurality of base station systems for transmitting traffic and the information to a mobile station, and a base station controller connected to the base station systems, for transmitting control information indicating combinability of the information transmitted to the mobile station. The method comprises the steps of: if the information is separately received from at least two base station systems, analyzing the received information and determining whether the information can be combined; if the information can be combined, combining the information received from the base station systems; and determining transmission information using the combined information.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
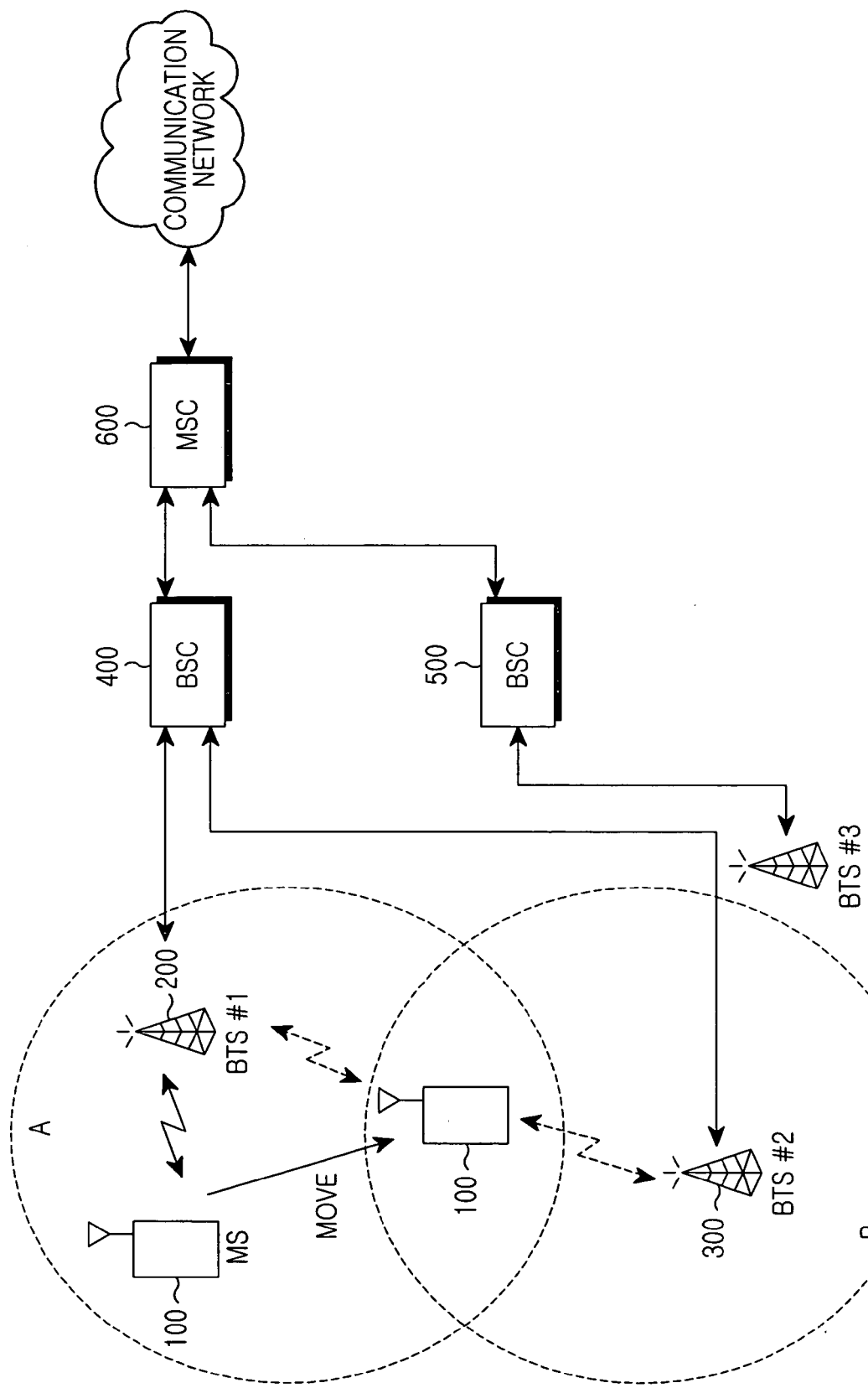
FIG. 1 is a diagram illustrating a reverse rate control apparatus in a mobile communication system according to an embodiment of the present invention.

Several preferred embodiments of the present invention will now be described in detail herein below with reference to the annexed drawings. In the drawings, the same or similar elements are denoted by the same reference numerals even though they are depicted in different drawings. Additionally, in the following description, a detailed description of known functions and configurations incorporated herein has been omitted for conciseness.

FIG. 1 is a diagram for describing a reverse rate control apparatus in a mobile communication system according to an embodiment of the present invention. When a mobile station 100 occupying traffic of a cell A moves to a cell B, the mobile station 100 is controlled by both a first base station system 200 and a second base station system 300. That is, the mobile station 100 receives rate control bit combined messages or ACK/NACK bits from the base station systems 200 and 300 included in its active set as a result of scheduling. In this case, if the base station systems 200 and 300 transmit messages indicating combinability of rate control bits transmitted to the mobile station 100 in a forward direction (hereinafter referred to as "rate control bit combinability indication messages"), the mobile station 100 determines whether the rate control bits can be combined. If the rate control bits can be combined, the base station systems 200 and 300 generate rate control bits. A rate control bit combinability indication message, transmitted from the base station systems 200 and 300 to the mobile station 100 in a forward direction, is illustrated in Table 1.

TABLE 1

| Active Set Member ID | Rate Control Bit Combinability Indicator |
|---|---|
| No. 1 | 0 |
| No. 2 | 1 |
| No. 3 | 0 |
| No. 4 | 1 |
| No. 5 | 1 |

The rate control bit combinability indication message is a message transmitted from a base station system to the mobile station 100 during a handoff, i.e., in a situation where the mobile station 100 changes its active set. Here, Active Set Member ID represents an ID for each of the base station systems included in the active set of the mobile station 100.

In Table 1, if a bit value indicating rate control bit combinability is '1', it means that rate control bit combining is available with a right upper base station system on the list. However, if a bit value indicating rate control bit combinability is '0', it means that rate control bit combining is unavailable with a right upper base station system on the list. As a result, a mobile station receiving the message illustrated in Table 1 analyzes the message such that rate control bits received from a base station system #1 and a base station system #2 are combined before being demodulated. Also, rate control bits received from a base station system #3, a base station system #4 and a base station system #5 are combined before being demodulated.

If the base station systems 200 and 300 transmit messages indicating combinability of ACK/NACK bits transmitted to the mobile station 100 in a forward direction (hereinafter referred to as "ACK/NACK bit combinability indication messages"), the mobile station 100 receives the ACK/NACK bit combinability indication messages, analyzes the received ACK/NACK bit combinability indication messages to determine a base station system that has ACK/NACK bits that can be combined, and outputs corresponding ACK/NACK bits, if the ACK/NACK bits can be combined.

Table 2 below illustrates an ACK/NACK bit combinability indication message transmitted from a base station system to the mobile station 100 in a forward direction.

TABLE 2

| Active Set Member ID | ACK/NACK Bit Combinability Indicator |
|---|---|
| No. 1 | 0 |
| No. 2 | 1 |
| No. 3 | 1 |
| No. 4 | 0 |
| No. 5 | 1 |

The ACK/NACK bit combinability indication message is transmitted from a base station system to the mobile station 100 during a handoff. Here, Active Set Member ID represents an ID for each of the base station systems included in the active set of the mobile station 100.

In Table 2, if a bit value indicating ACK/NACK bit combinability is '1', it means that ACK/NACK bit combining is available with a right upper base station system on the list. However, if a bit value indicating ACK/NACK bit combinability is '0', it means that ACK/NACK bit combining is unavailable with a right upper base station system on the list. As a result, a mobile station receiving the message illustrated in Table 2 analyzes the message such that ACK/NACK bits received from a base station system #1, a base station system #2, and a base station system #3 are combined before being demodulated. Also, ACK/NACK bits received from a base station system #4 and a base station system #5 are combined before being demodulated.

Figure 2:
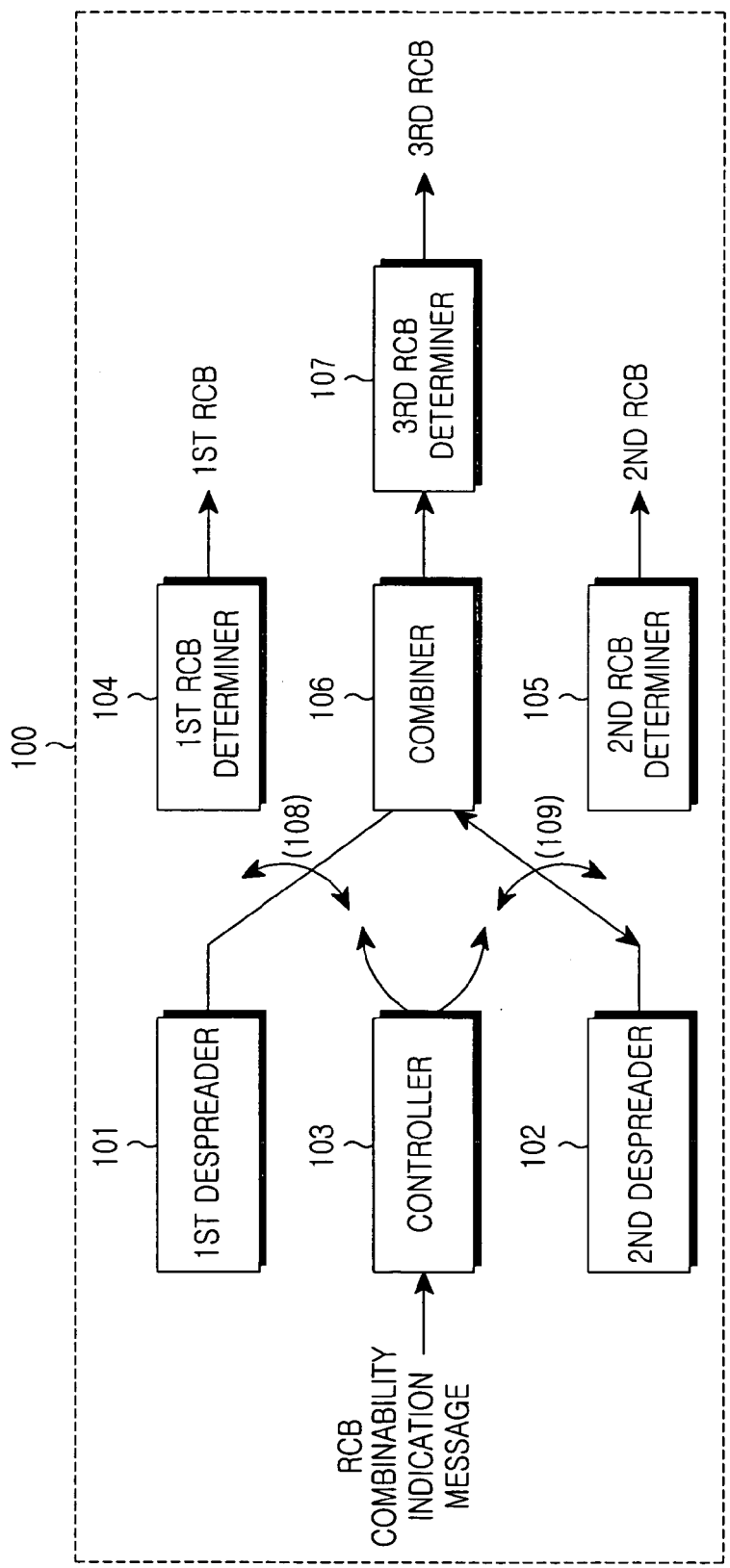
FIG. 2 is a diagram illustrating a rate control bit receiver in a mobile station according to an embodiment of the present invention.

A rate control bit receiver in a mobile station according to an embodiment of the present invention, as illustrated in FIG. 2, is comprised of first and second despreaders 101 and 102, a controller 103, first to third rate control bit (RCB) determiners 104, 105, and 107, and a combiner 106. The first despreader 101 despreads rate control bits received from a first base station system in an active set of a mobile station. The second despreader 102 despreads rate control bits received from a second base station system in the active set of the mobile station. The controller 103 controls operation of switches 108 and 109. The controller 103 receives a rate control bit combinability indication message. If the rate control bit combinability indication message indicates that rate control bits from the two base station systems can be combined, the controller 103 controls a first switch 108 so that an output of the first despreader 101 is input to the combiner 106. Also, the controller 103 controls a second switch 109 such that an output of a second despreader 102 is input to the combiner 106.

If the rate control bit combinability indication message indicates that rate control bits from the two base station systems cannot be combined, the controller 103 controls the first switch 108 such that an output of the first despreader 101 is input to the first rate control bit determiner 104. Also, the controller 103 controls the second switch 109 such that an output of a second despreader 102 is input to the second rate control bit determiner 105.

The first rate control bit determiner 104 determines a sign of a value received from the first despreader 101 and outputs a first rate control bit. The second rate control bit determiner 105 determines a sign of a value received from the second despreader 102 and outputs a second rate control bit. The combiner 106 combines outputs of the first despreader 101 and the second despreader 102. The third rate control bit determiner 107 determines a sign of a value output from the combiner 106 and outputs a third rate control bit.

Figure 3:
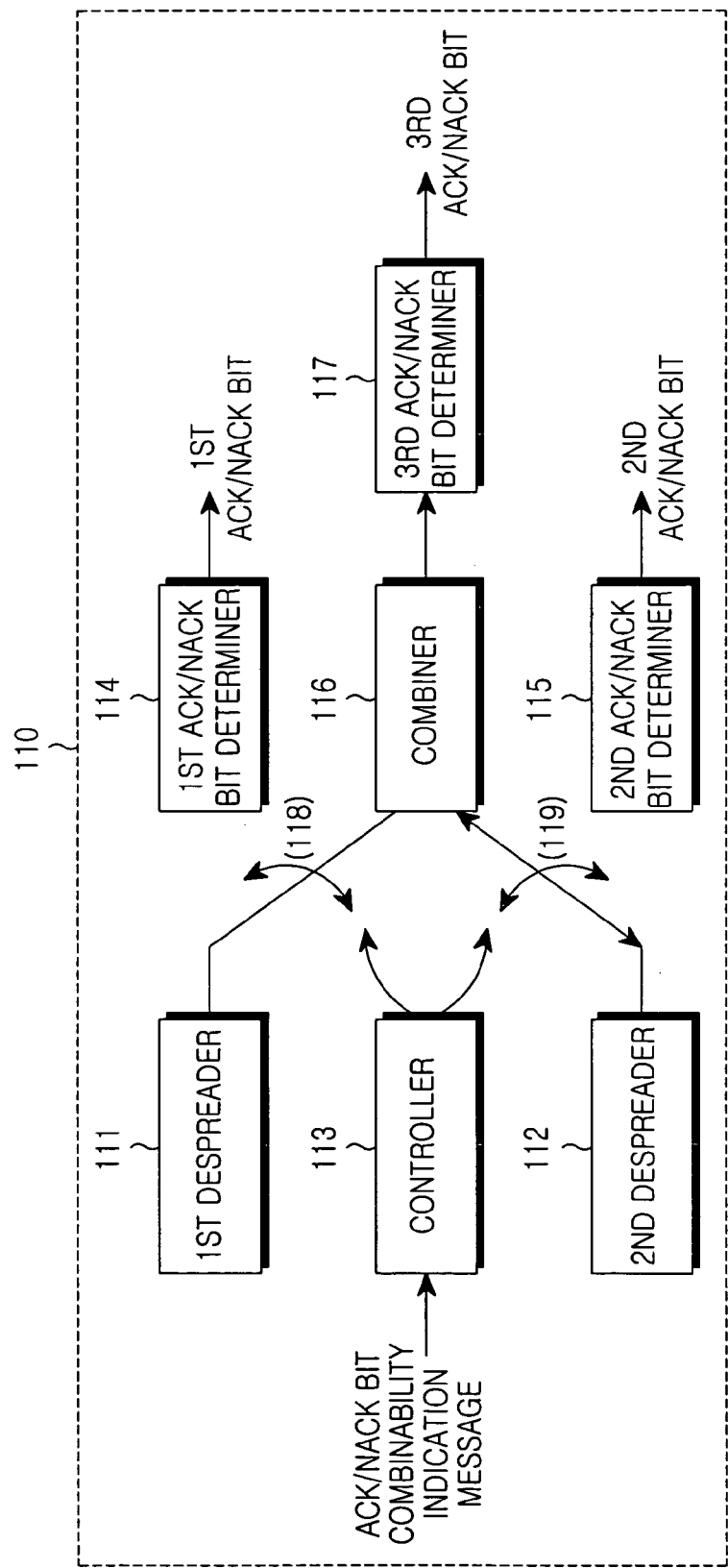
FIG. 3 is a diagram illustrating an ACK/NACK bit receiver in a mobile communication system according to an embodiment of the present invention.

In a mobile communication system according to an embodiment of the present invention, an ACK/NACK bit receiver, as illustrated in FIG. 3, comprises first and second despreaders 111 and 112, a controller 113, first to third ACK/NACK bit determiners 114, 115, and 117, and a combiner 116.

The first despreader 111 despreads ACK/NACK bits received from a first base station system in an active set of a mobile station. The second despreader 112 despreads ACK/NACK bits received from a second base station system in the active set of the mobile station. The controller 113 controls operation of switches 118 and 119, and receives an ACK/NACK bit combinability indication message.

If the ACK/NACK bit combinability indication message indicates that ACK/NACK bits from the two base station systems can be combined, the controller 113 controls a first switch 118 such that an output of the first despreader 111 is input to the combiner 116. Also, the controller 113 controls a second switch 119 such that an output of a second despreader 112 is input to the combiner 116.

If the ACK/NACK bit combinability indication message indicates that ACK/NACK bits from the two base station systems cannot be combined, the controller 113 controls the first switch 118 such that an output of the first despreader 111 is input to the first ACK/NACK bit determiner 114. Also, the controller 113 controls the second switch 119 such that an output of a second despreader 112 is input to the second ACK/NACK bit determiner 115.

The first ACK/NACK bit determiner 114 determines a sign of a value received from the first despreader 111 and outputs a first ACK/NACK bit. The second ACK/NACK bit determiner 115 determines a sign of a value received from the second despreader 112 and outputs a second ACK/NACK bit. The combiner 116 combines outputs of the first despreader 111 and the second despreader 112. The third ACK/NACK bit determiner 117 determines a sign of a value output from the combiner 116 and outputs a third ACK/NACK bit.

Figure 4:
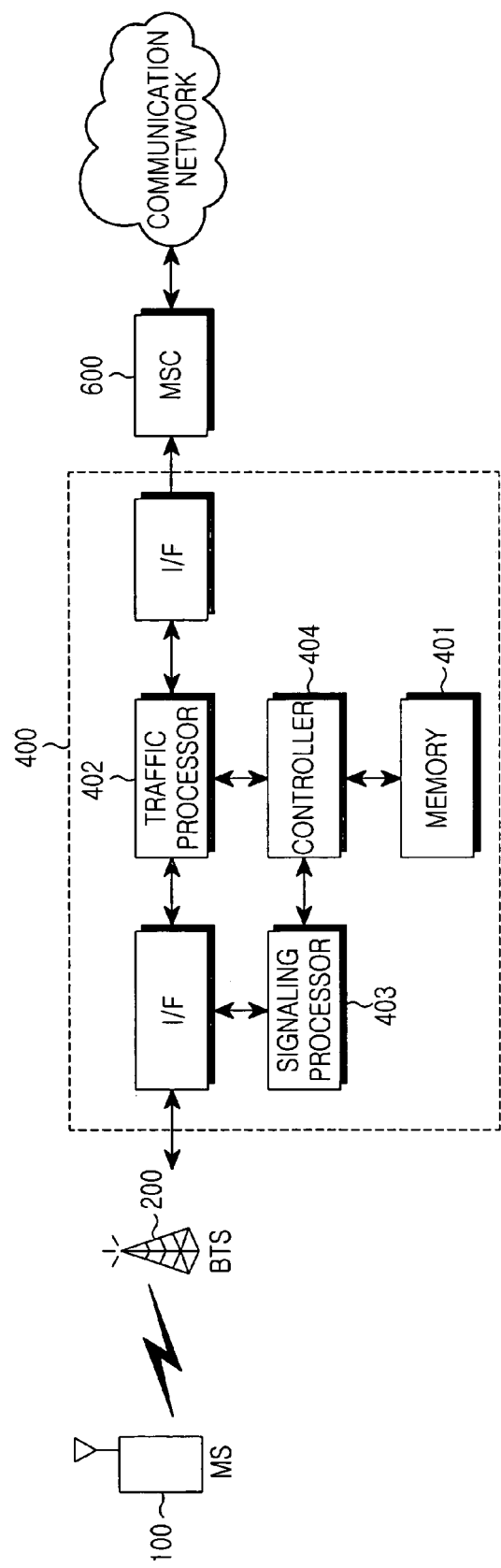
FIG. 4 is a diagram illustrating a base station controller according to an embodiment of the present invention.

FIG. 4 is a diagram illustrating a base station controller according to an embodiment of the present invention. Referring to FIG. 4, a base station controller 400 is connected to base station systems that communicates with the mobile station 100 using radio channels, and transmits control information indicating combinability of information transmitted to the mobile station 100. The base station controller 400, as illustrated in FIG. 4, includes a memory 401, a traffic processor 402, a signaling processor 403, and a controller 404.

The memory 401 stores information on each of neighbor base station systems 200 and 300, a message indicating rate control bit combinability, and a message indicating ACK/NACK bit combinability, which are determined according to whether the same information can be transmitted to the neighbor base station systems. The traffic processor 402 transmits information on a corresponding base station system to the mobile station 100, if a handoff situation of the mobile station 100 is detected. The signaling processor 403 processes signaling in order to provide the control information indicating combinability to the mobile station 100. The controller 404, when the mobile station 100 is in a handoff situation, checks base station systems belonging to an active set of the mobile station 100, determines whether the same information can be transmitted from each base station system to the mobile station 100, generates the control information according to the determination result, and outputs the generated control information to the signaling processor 403.

Figure 5:
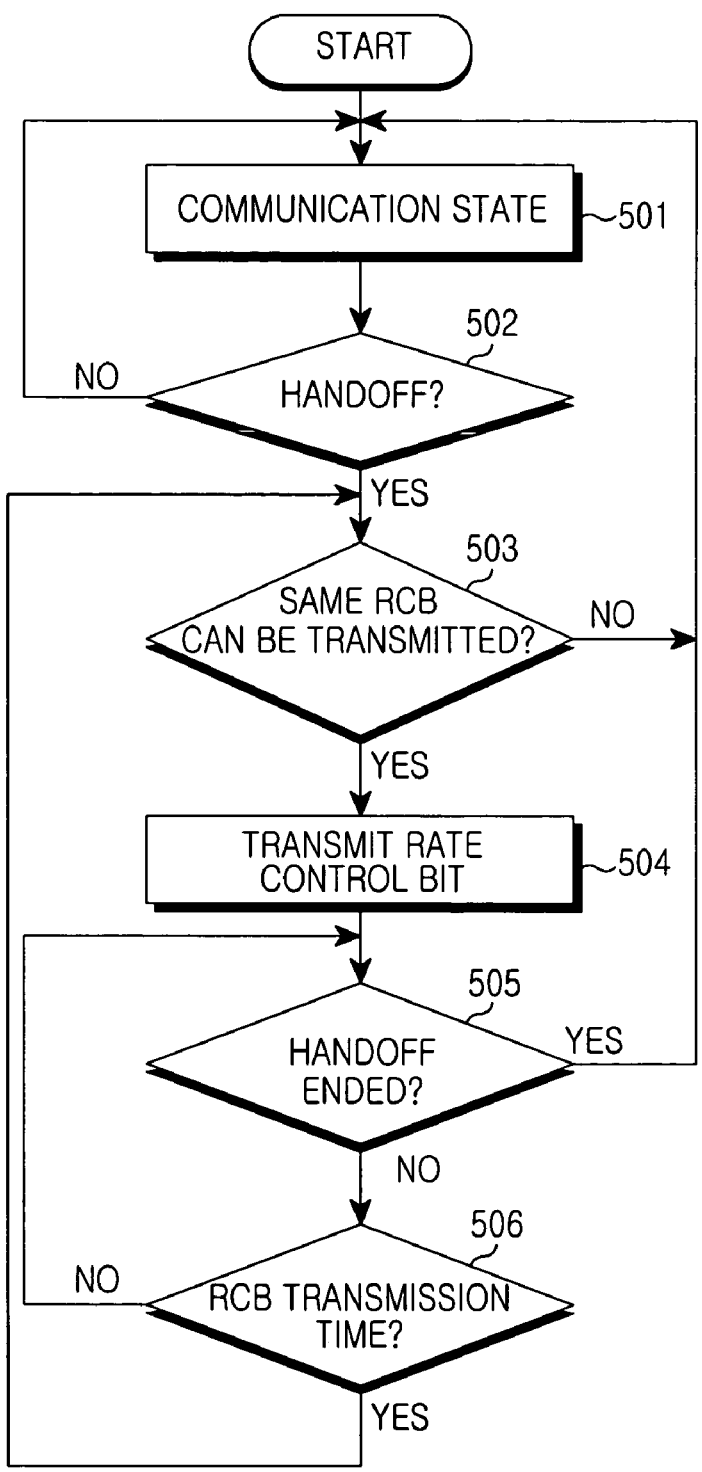
FIG. 5 is a flowchart illustrating a procedure for controlling a rate control bit combinability indication signal in a base station controller in a mobile communication system according to an embodiment of the present invention.

FIG. 5 is a flowchart illustrating a procedure for controlling a rate control bit combinability indication signal in a base station controller in a mobile communication system according to an embodiment of the present invention. Referring to FIG. 5, a base station controller 400 is in a communication state (or active state) in step 501. The "communication state" refers to a non-handoff situation where transmission/reception of a message related to call assignment and call process for a mobile station 100 is controlled via base station systems 200 and 300.

The base station controller 400 determines in step 502 whether handoff of the mobile station 100 has occurred via the base station systems 200 and 300. If handoff has not occurred from the mobile station 100, the base station controller 400 returns to step 501 to hold the communication state. However, if handoff has occurred from the mobile station 100, the base station controller 400 proceeds to step 503 where it determines whether the same rate control bits can be transmitted to the mobile station 100. Here, that the same rate control bits can be transmitted means that when handoff has occurred, the same rate control bits can be transmitted from the base station controller 400 to the mobile station 100 via at least two base station systems 200 and 300.

If the same rate control bits cannot be transmitted to the mobile station 100, the base station controller 400 returns to step 501 to hold the communication state. In a system where BSS scheduling is performed, rate control bit values received at the mobile station 100 from the base station systems in the active set can be different from one another.

However, if the same rate control bits can be transmitted via the base station systems 200 and 300, the base station controller 400 proceeds to step 504 where it transmits the same rate control bits to the mobile station 100 via the handoff base station systems. This process is continued while the mobile station 100 is in the handoff situation.

Thereafter, in step 505, the base station controller 400 determines whether handoff of the mobile station 100 has ended. If handoff of the mobile station 100 has ended, the base station controller 400 returns to step 501 to hold the communication state. However, if handoff of the mobile station 100 has not ended, the base station controller 400 determines in step 506 whether it is time to transmit a rate control bit to the mobile station 100.

If it is not the time to transmit a rate control bit, the base station controller 400 returns to step 505. However, if it is time to transmit a rate control bit, the base station controller 400 returns to step 503.

Figure 6:
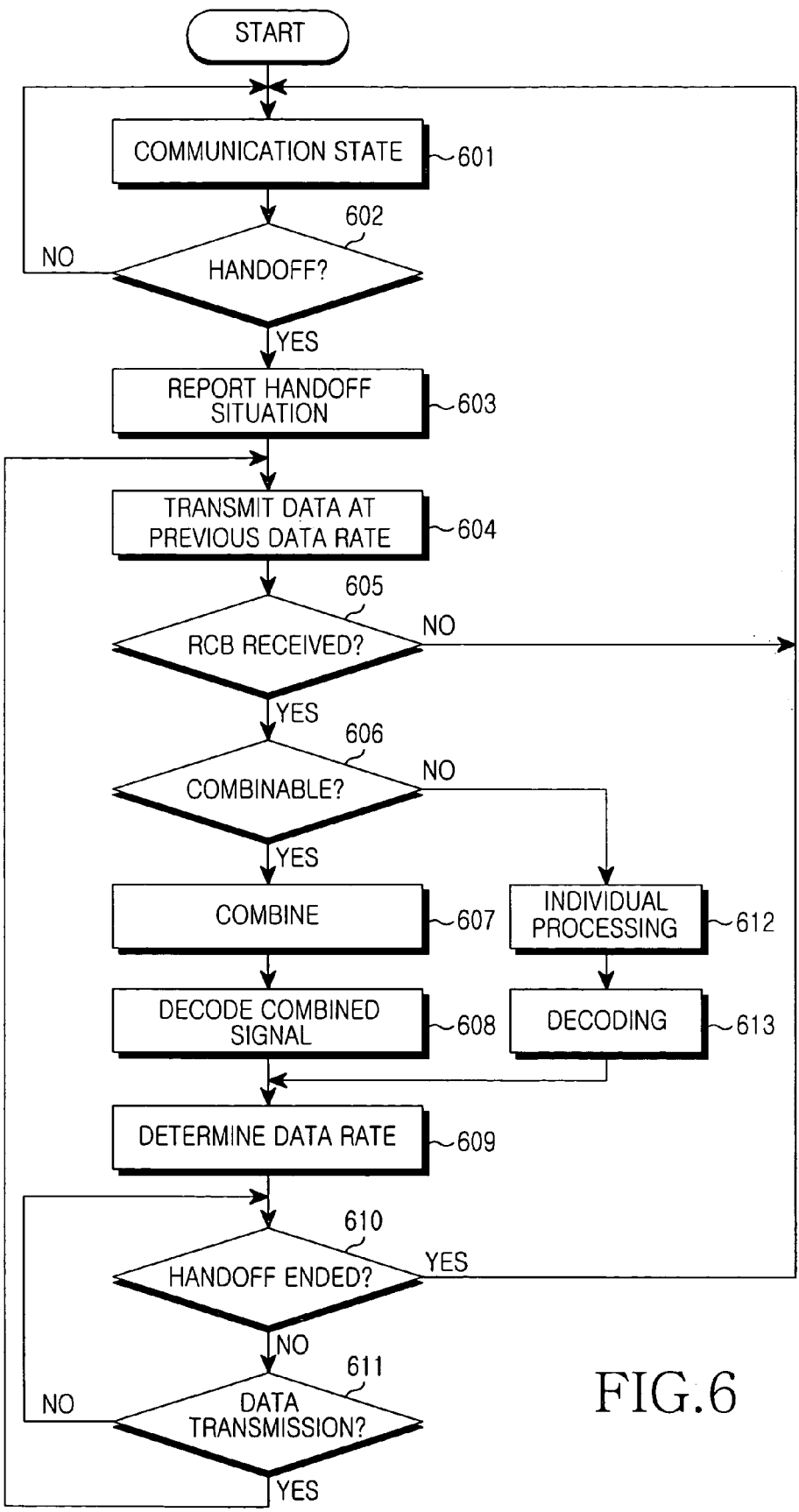
FIG. 6 is a flowchart illustrating a procedure for controlling a rate control bit combinability indication signal in a mobile station in a mobile communication system according to an embodiment of the present invention.

FIG. 6 is a flowchart illustrating a procedure for controlling a rate control bit combinability indication signal in a mobile station in a mobile communication system according to an embodiment of the present invention. Referring to FIG. 6, a mobile station 100 is in a communication state in step 601. As indicated above, the "communication state" refers to a non-handoff situation where transmission/reception of a message related to call assignment and call process is controlled via a base station system. The mobile station 100 determines in step 602 whether it is in a handoff state. If the mobile station 100 is not in a handoff state, the mobile station 100 returns to step 601. However, if the mobile station 100 is in a handoff state, the mobile station 100 proceeds to step 603 where it reports the handoff situation to a base station controller 400.

Thereafter, in step 604, the mobile station 100 transmits data to the base station controller 400 at a previously set data rate. The mobile station 100 determines in step 605 whether a rate control bit has been received from the base station controller 400. If no rate control bit has been received from the base station controller 400, the mobile station 100 returns to step 601 to hold the communication state. However, if a rate control bit has been received from the base station controller 400, the mobile station 100 proceeds to step 606 where it receives the rate control bit combinability indication message and determines whether rate control bits received from different base station systems can be combined.

If the received rate control bits can be combined, the mobile station 100 combines the received rate control bits in step 607, and decodes the combined signal in step 608. Thereafter, in step 609, the mobile station 100 determines an optimal data rate.

Thereafter, in step 610, the mobile station determines whether the handoff has ended. If the handoff has ended, the mobile station 100 returns to step 601 to hold the communication state. However, if the handoff has not ended, the mobile station 100 determines in step 611 whether data transmission is possible. If data transmission is possible, the mobile station 100 returns to step 604 where it transmits data to the base station controller 400. However, if data transmission is not possible, the mobile station 100 returns to step 610.

If it is determined in step 606 that combining is not possible, the mobile station 100 proceeds to step 612 where it individually processes rate control bits transmitted from the base station controller 400. Thereafter, the mobile station 100 decodes the rate control bits in step 613, and determines a data rate in step 609. Thereafter, the mobile station 100 continues step 610.

Figure 7:
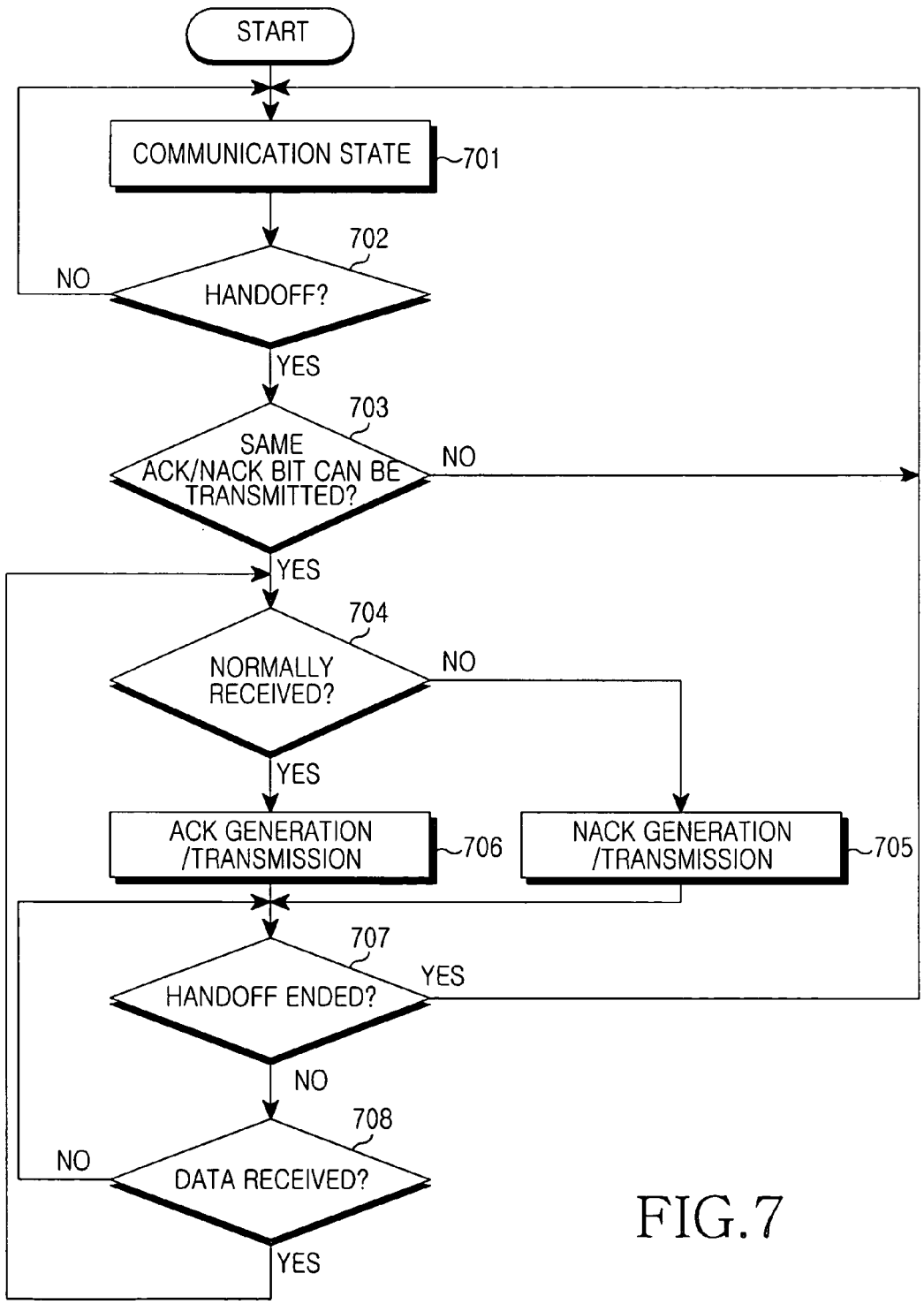
FIG. 7 is a flowchart illustrating a procedure for controlling an ACK/NACK bit combinability indication signal in a base station controller in a mobile communication system according to an embodiment of the present invention.

FIG. 7 is a flowchart illustrating a procedure for controlling an ACK/NACK bit combinability indication signal in a base station controller in a mobile communication system according to an embodiment of the present invention. Referring to FIG. 7, a base station controller 400 is in a communication state in step 701. The base station controller 400 determines in step 702 whether handoff has occurred from the mobile station 100. If handoff has not occurred from the mobile station 100, the base station controller 400 returns to step 701 to hold the communication state.

However, if handoff has occurred from the mobile station 100, the base station controller 400 proceeds to step 703 where it determines whether the same ACK/NACK bit can be transmitted to the mobile station 100. If the same ACK/NACK bit cannot be transmitted to the mobile station 100, the base station controller 400 returns to step 701 to hold the communication state. In a system where BSS scheduling is performed, ACK/NACK bit values received at the mobile station 100 from the base station systems in the active set can be different from one another.

However, if the same ACK/NACK bits can be transmitted to the mobile station 100, the base station controller 400 proceeds to step 704 where it determines whether data can be normally received from the mobile station 100. If data cannot be normally received from the mobile station 100, the base station controller 400 generates a NACK message and transmits the generated NACK message to the mobile station 100 in step 705. However, if data can be normally received from the mobile station 100, the base station controller 400 generates an ACK message and transmits the generated ACK message to the mobile station 100 in step 706.

Thereafter, the base station controller 400 determines in step 707 whether the handoff of the mobile station 100 has ended. If the handoff of the mobile station 100 has ended, the base station controller 400 returns to step 701 to hold the communication state only in one base station system. However, if the handoff of the mobile station 100 has not ended, the base station controller 400 determines in step 708 whether data has been received from the mobile station 100. If no data has been received from the mobile station 100, the base station controller 400 returns to step 707 where it analyzes the handoff situation. However, if data has been received from the mobile station 100, the base station controller 400 returns to step 704.

Figure 8:
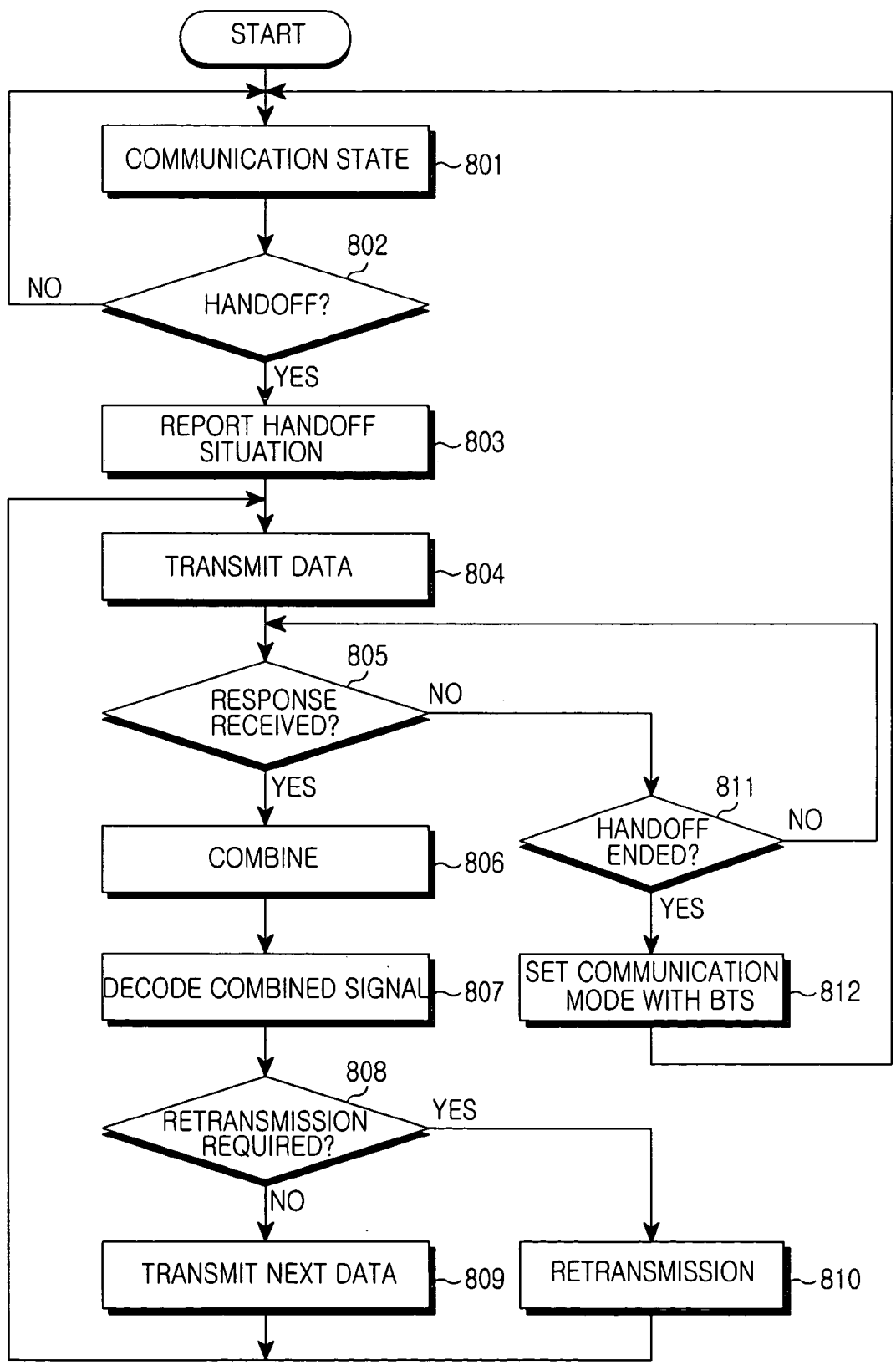
FIG. 8 is a flowchart illustrating a procedure for controlling an ACK/NACK bit combinability indication signal in a mobile station in a mobile communication system according to an embodiment of the present invention.

FIG. 8 is a flowchart illustrating a procedure for controlling an ACK/NACK bit combinability indication signal in a mobile station in a mobile communication system according to an embodiment of the present invention. Referring to FIG. 8, a mobile station 100 is in a communication state in step 801. The mobile station 100 determines in step 802 whether it is in a handoff state. If the mobile station 100 is not in a handoff state, the mobile station 100 returns to step 801 to hold the communication state.

However, if the mobile station 100 is in a handoff state, the mobile station 100 proceeds to step 803 where it reports the handoff situation to a base station controller 400. In this case, the mobile station 100 can transmit active set information thereof together. However, when the base station controller 400 has active set information of the mobile station 100, the mobile station 100 is not allowed to transmit active set information.

Thereafter, in step 804, the mobile station 100 transmits data to the base station controller 400 at a previously set data rate. The mobile station 100 determines in step 805 whether a response signal has been received from the base station controller 400. The "response signal" means the same ACK/NACK bit transmission signaling to the mobile station 100.

If a response signal has been received from the base station controller 400, the mobile station 100 combines the received response signal in step 806, and decodes the combined signal in step 807.

Thereafter, in step 808, the mobile station 100 determines whether data retransmission to the base station controller 400 is required. If data retransmission to the base station controller 400 is not required, the mobile station 100 transmits next data to the base station controller 400 in step 809. However, if data retransmission to the base station controller 400 is required, the mobile station 100 retransmits previous data to the base station controller 400 in step 810. After the retransmission, the mobile station 100 returns to step 804 to hold the communication state.

If it is determined in step 805 that no response signal has been received from the base station controller 400, the mobile station 100 determines in step 811 whether the handoff has ended. If the handoff has ended, the mobile station 100 sets a communication mode with a corresponding base station system 200 in step 812, and then returns to step 801. However, if it is determined in step 811 that the handoff has not ended, the mobile station returns to step 805 where it continues a suspended state until a response signal is received from the base station controller 400.

As is understood from the foregoing description, for reverse transmission/reception of rate control bits, a receiver in a mobile station transmits a message indicating combinability of rate control bits received from several base station systems through signaling, thereby securing efficient transmission/reception of the rate control bits, and improving reliability of the rate control bits.

In addition, for reverse transmission/reception of ACK/NACK bits, a receiver in a mobile station transmits a message indicating combinability of ACK/NACK bits received from several base station systems, thereby securing efficient transmission/reception of the ACK/NACK bits, and improving reliability of the ACK/NACK bits.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for transmitting a combinability indication message for control information in a mobile communication system including a mobile station, a plurality of base station systems for transmitting traffic and the control information to the mobile station, and a base station controller connected to the base station systems, for transmitting the control information to the mobile station, the apparatus comprising:

a memory for storing control information for base station systems included in an active set of the mobile station and a combinability indication message determined according to whether identical control information can be transmitted via the base station systems;

a signaling processor for performing a signaling process for transmitting the combinability indication message to the mobile station; and a controller for checking, during handoff of the mobile station, the base station systems belonging to the active set of the mobile station, stored in the memory, determining whether the identical control information can be transmitted to the mobile station via the base station systems in the active set, generating the combinability indication message according to the determination result, and outputting the generated combinability indication message to the signaling processor.

2. The apparatus of claim 1, wherein the control information is a rate control bit (RCB).

3. The apparatus of claim 1, wherein the control information is an acknowledgement/negative acknowledgement (ACK/NACK) bit.

4. A mobile station apparatus in a mobile communication system including a plurality of base station systems for transmitting traffic and control information to a mobile station, and a base station controller connected to the base station systems, for transmitting a combinability indication message indicating combinability of the control information transmitted to the mobile station, the mobile station apparatus comprising:

a plurality of despreaders for separately despreading the control information received from at least two base station systems among the base station systems;

a combiner for combining the control information received via the despreaders;

a controller for directing outputs of the despreaders to the combiner, when the combinability indication message indicates that identical control information from the base station systems can be transmitted; and a control information determiner for determining the control information based on the combined control information output from the combiner.

5. The mobile station apparatus of claim 4, further comprising control information determiners, being identical in number to the despreaders, for receiving outputs of the corresponding despreaders, and determining the control information received from the base station systems;

wherein when the received control information cannot be combined, the controller directs outputs of the despreaders to the control information determiners corresponding to the despreaders.

6. The mobile station apparatus of claim 4, wherein the control information is a rate control bit (RCB).

7. The mobile station apparatus of claim 4, wherein the control information is an acknowledgement/negative acknowledgement (ACK/NACK) bit.

8. A method for transmitting control information in a mobile communication system including a mobile station, a plurality of base station systems for transmitting traffic and the control information to the mobile station, and a base station controller connected to the base station systems, for transmitting a combinability indication message indicating combinability of the control information transmitted to the mobile station, the method comprising the steps of:

checking base station systems belonging to an active set of the mobile station during handoff of the mobile station;

determining whether identical control information can be transmitted to the mobile station via the base station systems in the active set; and generating a combinability indication message indicating combinability of the control information transmitted to the mobile station according to the determination result, and transmitting the combinability indication message to the mobile station.

9. The method of claim 8, wherein the control information is a rate control bit (RCB).

10. The method of claim 8, wherein the control information is an acknowledgement/negative acknowledgement (ACK/NACK) bit.

11. A method for receiving control information in a mobile communication system including a plurality of base station systems for transmitting traffic and the control information to a mobile station, and a base station controller connected to the base station systems, for transmitting a combinability indication message indicating combinability of the control information transmitted to the mobile station, the method comprising the steps of:

if the control information is separately received from at least two of the base station systems, analyzing the received combinability indication message and determining whether the control information can be combined;

if the control information can be combined, combining the control information received from the at least two of the base station systems; and determining control information using the combined control information.

12. The method of claim 11, wherein the control information is a rate control bit (RCB).

13. The method of claim 11, wherein the control information is an acknowledgement/negative acknowledgement (ACK/NACK) bit.

* * * * *